United States Patent
Gellis

(10) Patent No.: US 9,498,009 B2
(45) Date of Patent: Nov. 22, 2016

(54) UTILITY GLOVE

(75) Inventor: David Gellis, Waterbury Center, VT (US)

(73) Assignee: MADGRIP HOLDINGS, LLC, Essex Junction, VT (US)

( * ) Notice: Subject to any disclaimer, the term of this patent is extended or adjusted under 35 U.S.C. 154(b) by 1184 days.

(21) Appl. No.: 12/577,273

(22) Filed: Oct. 12, 2009

(65) Prior Publication Data

US 2010/0024095 A1 Feb. 4, 2010

Related U.S. Application Data

(63) Continuation-in-part of application No. 12/218,562, filed on Jul. 16, 2008, now abandoned.

(Continued)

(51) Int. Cl.
*B29C 45/14* (2006.01)
*A41D 19/00* (2006.01)
(Continued)

(52) U.S. Cl.
CPC ..... *A41D 19/0065* (2013.01); *A41D 19/01558* (2013.01); *A41D 19/02* (2013.01); *B29C 45/14* (2013.01)

(58) Field of Classification Search
CPC .................. B29C 45/14; A41D 19/02; A41D 19/01558; A41D 19/0065
(Continued)

(56) References Cited

U.S. PATENT DOCUMENTS 1,664,542 A    4/1928 Douglass
1,725,065 A *  8/1929 Edwards ........................ 2/168
(Continued)

FOREIGN PATENT DOCUMENTS

CA    2637973        1/2009
CL    200800807 A    3/2008
(Continued)

OTHER PUBLICATIONS

Vibram Five Finger Classic, http://www.vibramfivefingers.com/products/images/prodcuts/102//large.jpg, viewed Jul. 10, 2007.
(Continued)

*Primary Examiner* — Katherine Moran
(74) *Attorney, Agent, or Firm* — Florek & Endres PLLC

(57) ABSTRACT

A utility glove having a palm side including a three dimensional molded palm portion formed of an elastomeric material with a thumb portion and at least one finger portion and a back side of the glove comprising a fabric material, with the molded palm portion formed in a pre-curved configuration to create a concave shape. The molded palm has one or more of thickened areas for abrasion resistance, padded areas for comfort, flex grooves for improved movement, textured grip areas for improved grip and/or perforations for breathability. The molded palm portion may be formed of different elastomeric materials to take advantage of the different characteristics of the particular materials.

A molded portion of the utility glove may be formed by placing a piece of fabric against a mold part formed in the shape of at least a portion of a hand, bringing a corresponding mold part having varying thicknesses into molding relation with the mold part in the shape of at least a portion of the hand and injecting an elastomeric material into the mold to form the molded portion.

28 Claims, 8 Drawing Sheets

Related U.S. Application Data

(60) Provisional application No. 60/950,028, filed on Jul. 16, 2007.

(51) Int. Cl.
  *A41D 19/015* (2006.01)
  *A41D 19/02* (2006.01)

(58) Field of Classification Search
  USPC .................................. 2/161.1, 161.6, 161.8
  See application file for complete search history.

(56) References Cited

U.S. PATENT DOCUMENTS

| | | | |
|---|---|---|---|
| 1,979,130 A * | 10/1934 | Wiley | 2/168 |
| 2,120,722 A * | 6/1938 | Tillotson | 427/261 |
| 2,907,047 A * | 10/1959 | Steinberg | 2/161.3 |
| 2,913,729 A * | 11/1959 | Wisenburg | 2/167 |
| 3,035,291 A | 5/1962 | Bingham, Jr. | |
| 3,324,220 A | 6/1967 | Stansfield | |
| 3,383,782 A | 5/1968 | McGinnity | |
| 3,663,679 A | 5/1972 | Barre et al. | |
| 3,735,511 A | 5/1973 | Gilbert et al. | |
| 3,877,101 A | 4/1975 | Lewis | |
| 3,896,202 A | 7/1975 | Palau | |
| 3,921,313 A | 11/1975 | Mahide et al. | |
| 3,975,840 A | 8/1976 | Juzenko | |
| 4,021,860 A | 5/1977 | Swallow et al. | |
| 4,051,553 A * | 10/1977 | Howard | 2/20 |
| 4,094,014 A * | 6/1978 | Schroeder | 2/161.8 |
| D248,898 S | 8/1978 | DeLeone et al. | |
| 4,134,955 A | 1/1979 | Hanrahan, Jr. et al. | |
| 4,150,455 A | 4/1979 | Fukuoka | |
| 4,268,931 A | 5/1981 | Salomon | |
| 4,294,022 A | 10/1981 | Stockli et al. | |
| 4,295,238 A | 10/1981 | Clark | |
| 4,359,783 A | 11/1982 | Andrews | |
| 4,371,988 A * | 2/1983 | Berend | 2/167 |
| D273,054 S | 3/1984 | Brinson, Jr. | |
| 4,447,967 A | 5/1984 | Zaino | |
| 4,453,904 A | 6/1984 | Koliwer | |
| 4,785,479 A | 11/1988 | Watanabe | |
| D321,426 S | 11/1991 | Brinker | |
| 5,092,347 A | 3/1992 | Shaffer et al. | |
| D328,369 S | 7/1992 | Hong | |
| D372,112 S | 7/1996 | Garneau | |
| 5,598,582 A * | 2/1997 | Andrews et al. | 2/16 |
| 5,617,585 A | 4/1997 | Fons et al. | |
| 5,640,714 A | 6/1997 | Tanaka | |
| 5,675,839 A | 10/1997 | Gordon et al. | |
| 6,044,493 A | 4/2000 | Post | |
| 6,065,155 A * | 5/2000 | Sandusky | 2/161.1 |
| 6,081,928 A | 7/2000 | Bourne | |
| 6,128,778 A | 10/2000 | Castagneri | |
| 6,185,747 B1 | 2/2001 | Hughes | |
| 6,415,446 B1 | 7/2002 | McLean et al. | |
| D462,824 S | 9/2002 | Jones, Sr. | |
| D468,074 S | 1/2003 | Votel | |
| 6,578,205 B1 | 6/2003 | King | |
| 6,618,860 B1 | 9/2003 | Sullivan et al. | |
| 6,675,392 B2 | 1/2004 | Albert | |
| 6,704,939 B2 | 3/2004 | Faulconer | |
| 6,845,519 B2 | 1/2005 | Garneau | |
| 6,889,389 B2 | 5/2005 | Kleinert | |
| 6,928,658 B2 * | 8/2005 | Taira et al. | 2/161.6 |
| 6,943,130 B2 | 9/2005 | Gabbrielli | |
| D514,771 S | 2/2006 | Jaeger | |
| D514,772 S | 2/2006 | Bevier | |
| D515,782 S | 2/2006 | Mattesky | |
| 7,100,212 B2 * | 9/2006 | Jaeger | 2/161.1 |
| D536,837 S | 2/2007 | Jaeger | |
| 7,287,285 B2 | 10/2007 | Jaeger et al. | |
| 7,310,826 B2 | 12/2007 | Kishihara | |
| D558,952 S | 1/2008 | Ash et al. | |
| D579,181 S | 10/2008 | Swanson et al. | |
| D581,102 S | 11/2008 | Faulconer | |
| D582,134 S | 12/2008 | Von Conta et al. | |
| D584,026 S | 1/2009 | Kleinert | |
| 7,475,433 B2 | 1/2009 | Coulter et al. | |
| D586,982 S | 2/2009 | Fliri | |
| D589,679 S | 4/2009 | Rolfe | |
| 2002/0010957 A1 | 1/2002 | Katz | |
| 2003/0126666 A1 | 7/2003 | McNamara | |
| 2004/0025226 A1 | 2/2004 | Jaeger | |
| 2004/0025227 A1 * | 2/2004 | Jaeger | 2/161.6 |
| 2005/0160516 A1 * | 7/2005 | Price | 2/161.6 |
| 2006/0143767 A1 | 7/2006 | Yang et al. | |
| 2007/0144039 A1 | 6/2007 | Fliri | |
| 2007/0204381 A1 | 9/2007 | Thompson et al. | |
| 2008/0060111 A1 | 3/2008 | Baacke et al. | |
| 2008/0110291 A1 | 5/2008 | Vitek | |
| 2009/0038052 A1 | 2/2009 | Gellis | |
| 2009/0139007 A1 | 6/2009 | Bevier | |
| 2009/0144881 A1 | 6/2009 | Panosian et al. | |
| 2009/0320178 A1 | 12/2009 | Faulconer | |
| 2010/0083420 A1 | 4/2010 | Bouckaert | |
| 2011/0030121 A1 | 2/2011 | Smalls | |
| 2011/0258879 A1 | 10/2011 | Dananberg et al. | |

FOREIGN PATENT DOCUMENTS

| | | |
|---|---|---|
| JP | 58-005237 A | 1/1983 |
| JP | 61-205581 U | 12/1986 |
| JP | 64-58604 A | 3/1989 |
| JP | 2007084975 A | 4/2007 |
| JP | 3131685 U | 5/2007 |
| JP | 2008050745 A | 3/2008 |
| WO | WO2007038487 | 4/2007 |

OTHER PUBLICATIONS

Copenheaver, Blaine R. "International Search Report and Written Opinion of the International Searching Authority, or the Declaration", Dec. 2, 2010.

Baharlou, Simin, "International Preliminary Report on Patentability, and Written Opinion of the International Searching Authority for International Patent Application No. PCT/US2010/052168," Apr. 17, 2012.

* cited by examiner

UTILITY GLOVE

REFERENCE TO RELATED APPLICATIONS

This application is a continuation in part of U.S. patent application Ser. No. 12/218,562 filed on Jul. 16, 2008 now abandoned, which claims priority to U.S. Provisional Patent Application No. 60/950,028 filed on Jul. 16, 2007. Each is incorporated by reference in its entirety.

FIELD OF THE INVENTION

The present invention relates to the field of utility gloves, for work, gardening and the like and, more particularly, to utility gloves for work, gardening and the like having elastomeric reinforcements for improved protection of the wearers' hands.

BACKGROUND OF THE INVENTION

Utility gloves are used in areas such as gardening, construction or general work at a job site, production or garden facility or around one's home. These gloves usually contain a gripping portion that prevents items from slipping out of the user's hand, prevent injury to the user's skin such as cuts, scrapes and blisters, and provide a better grip when turning or grabbing objects. The gripping portion of the glove is usually applied to a knit nylon glove by dipping the nylon glove into an elastomeric material, such as natural or synthetic rubber, to apply an elastomeric gripping surface to the glove. This process increases the density of the glove and maintains a fabric portion which tends to absorb moisture and dirt and is hard to clean.

The purpose of the present invention is to create a utility glove with a seamless reinforcement in one or more zones most subject to abrasion. In addition to minimizing the seams, additional material or padding is provided in areas most subject to abrasion and/or impact, and this padding is preferably included without seams as well. In this regard, depending on the end usage envisioned, it is possible to adjust the amount of elastomeric material, including a natural or synthetic rubber, used in strategic areas to protect against impact and abrasion. Ultimately, the use of such padding provides the end user with a longer lasting, more comfortable glove. Additionally, the present invention includes the ability to provide different textures in the elastomeric material at strategic areas, to further provide one or more enhanced gripping surfaces.

SUMMARY OF THE INVENTION

It is therefore an object of the invention is to create a utility glove that is an improvement over typical dipped nylon knit utility gloves.

Another object of the invention is to provide additional durability and an ability to have varying palm thicknesses without having to increase the density of the knit utility glove.

A further object of the invention is to remove the reliance on fabric absorption of the elastomeric material to create density.

A still further object of the invention is to provide utility gloves with strategically placed padding and/or abrasion resistance zones as well as enhanced grip zones.

Yet a further object of the invention is to provide palm construction including an elastomeric material optionally without a knit backing, which typically absorbs excessive amounts of moisture and dirt. This allows for easier cleaning of the glove by simply being able to clean it off with a damp cloth as opposed to being laundered.

Another object of the invention is to create the maximum protection against abrasion in what typically are areas that require reinforcement, i.e., the index finger and thumb, as well as possibly the area between the index finger and thumb and the area directly below the base and crotch of each finger.

Still a further object of the invention is to provide abrasion and impact protection by raising the elastomeric material in the areas that are most likely to be subject to abrasion and impact, namely, the base of the thumb and the area of the palm directly below the fingers.

Another object of the invention is to create a molded component that can be altered to have varying elastomeric materials in different areas to provide for improved characteristics of the glove, and most particularly grip and flexibility. For example, softer elastomeric materials can be used for flexibility in areas less prone to wear and stronger, textured elastomeric materials can be used on in areas related to grip.

A further objective of the invention is to create a more natural feeling molded glove having a pre-curved concave palm portion, where the middle of the palm portion is set in from the edges of the palm portion to create an at least partially cupped shape, to minimize bunching when the wearer's hand closes. This pre-curved palm portion may also continue or extend to the fingers for a more natural shape of the hand at rest.

Still other objects and advantages of the invention will, in part, be obvious and will, in part, be apparent from the specification.

These and other objects are obtained through the utility glove of the present invention having a palm side including a three dimensional molded palm portion formed of an elastomeric material with a thumb portion and at least one finger portion and a back side of the glove comprising a fabric material, the molded palm portion formed in a pre-curved configuration. The molded palm portion may have one or more of thickened areas for abrasion resistance, padded areas for comfort, flex grooves for improved movement and textured grip areas for improved grip. The molded palm portion may be formed of different elastomeric materials to take advantage of the different characteristics of the particular materials.

It is also contemplated that the back side of the glove includes a molded portion, so as to form a guard over the user's knuckles or back of the hand that may be vulnerable to injury in some uses. The molded back may be independent from or formed integrally with the molded front side of the glove, and may be formed so that the molded portion extends 360° about the wearer's hand.

A molded portion of a utility glove may be formed by placing a piece of heat resistant fabric against a mold part formed in the shape of at least a portion of a hand, bringing a corresponding mold part into molding relation with the mold part in the shape of at least a portion of the hand and injecting an elastomeric material into the mold to form the molded palm portion.

It is anticipated that the mold part in the shape of at least a portion of the hand is formed in different sizes relative to the glove sizes of the potential users and the corresponding mold part includes one or more of one or more textured areas, one or more thickened areas, one or more padded areas and one or more flex grooves. Preferably, the heat resistant fabric is a knit hydrophilic material to improve absorbance of the elastomeric material.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENTS

Figure 1:
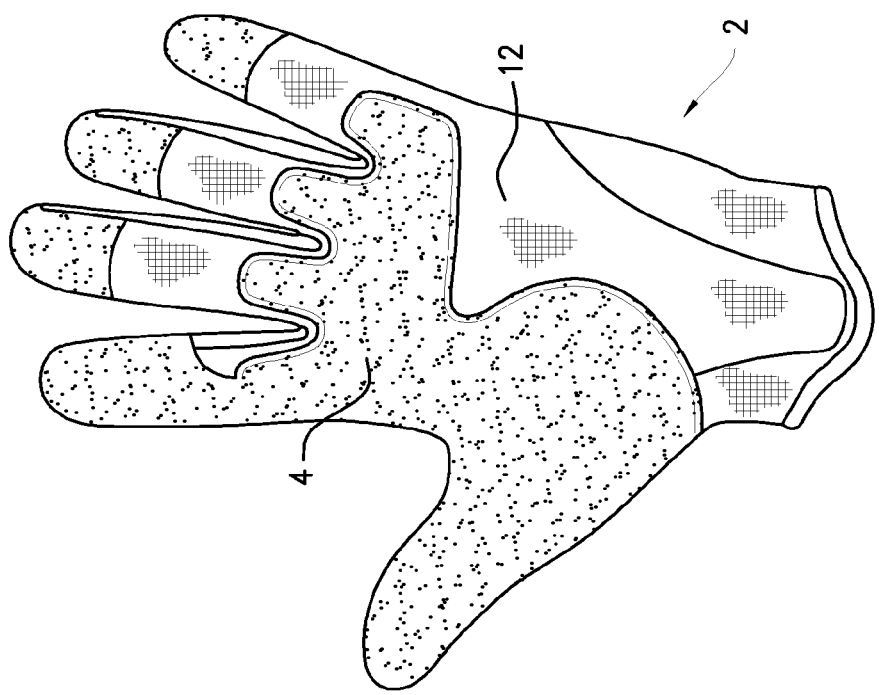
FIG. 1 shows a front view, palm side, of a utility glove according to the invention.
Figure 6:
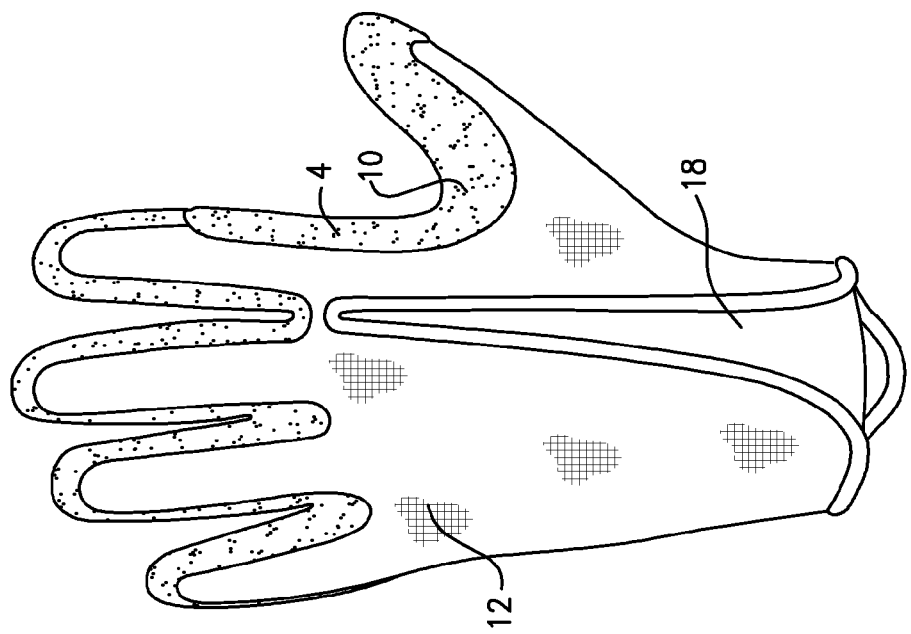
FIG. 6 shows the palm side of the gardening glove with the gripping portions of FIG. 5.
Figure 7:
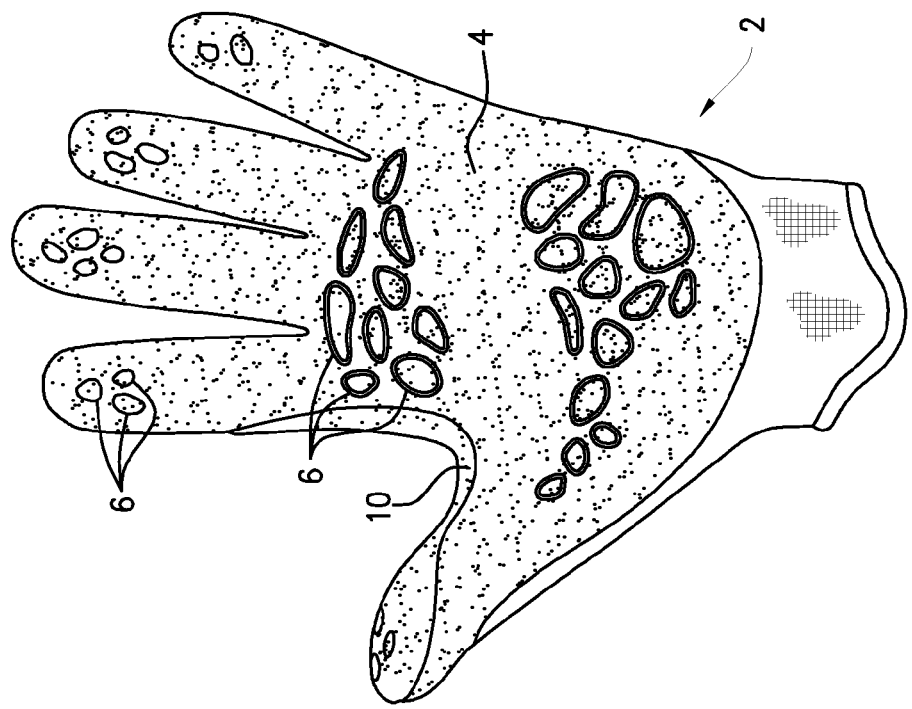
FIG. 7 shows the back side of the glove of FIG. 6.

FIG. 1 shows the palm side of a utility glove 2 with a molded palm portion 4. The molded palm portion 4 of the glove 2 preferably has embossed gripping details 6, as shown in FIG. 6, debossed flex grooves 8, shown in FIG. 4 and raised textured grip areas 10, shown in FIGS. 4 and 6. In this regard, the molded palm portion 4 of the embodiment of FIG. 1 preferably includes raised textured grip areas 10 shown as a raised or thicker textured index finger tip and thumb tip for better gripping and reinforcement. The palm side of the utility glove 2 shown in FIG. 1 also includes a fabric material 12 in the area beyond the molded palm portion 4, although such a fabric material 12 is not required as an element of the palm side of the present invention.

Figure 2:
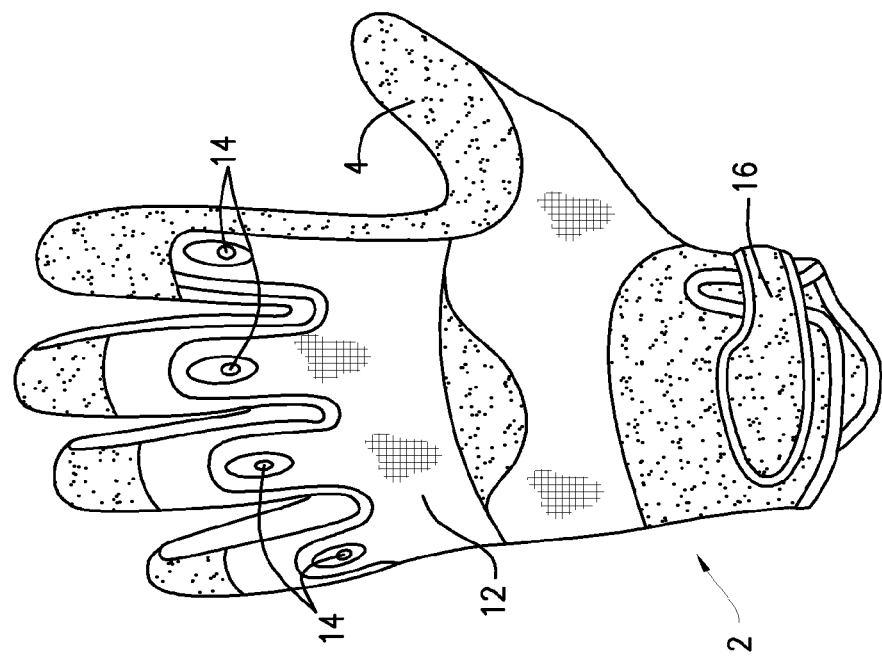
FIG. 2 shows a back view of the glove of FIG. 1.

FIG. 2 shows the back side of the glove 2 including a fabric material 12 and having, preferably, molded areas 14 applied with raised perforated protective shapes. Of course, any molded portion can be formed on the back side of the glove 2, including a molded portion that covers the knuckles where the fingers join the back of the hand or the back of the hand itself. The fabric material 12 on the back side is preferably formed with the fabric material 12 on the palm side of the glove or is sewn to the palm side of the glove 2, either to the molded palm portion 4 or the fabric material 12 of the palm side, with the fabric being continuous from within the palm side being preferred. There is preferably also a closure element, shown as a molded wrist strap 16, provided to afford a better fit and help keep the glove 2 securely on the user's hand while in use.

Figure 3:
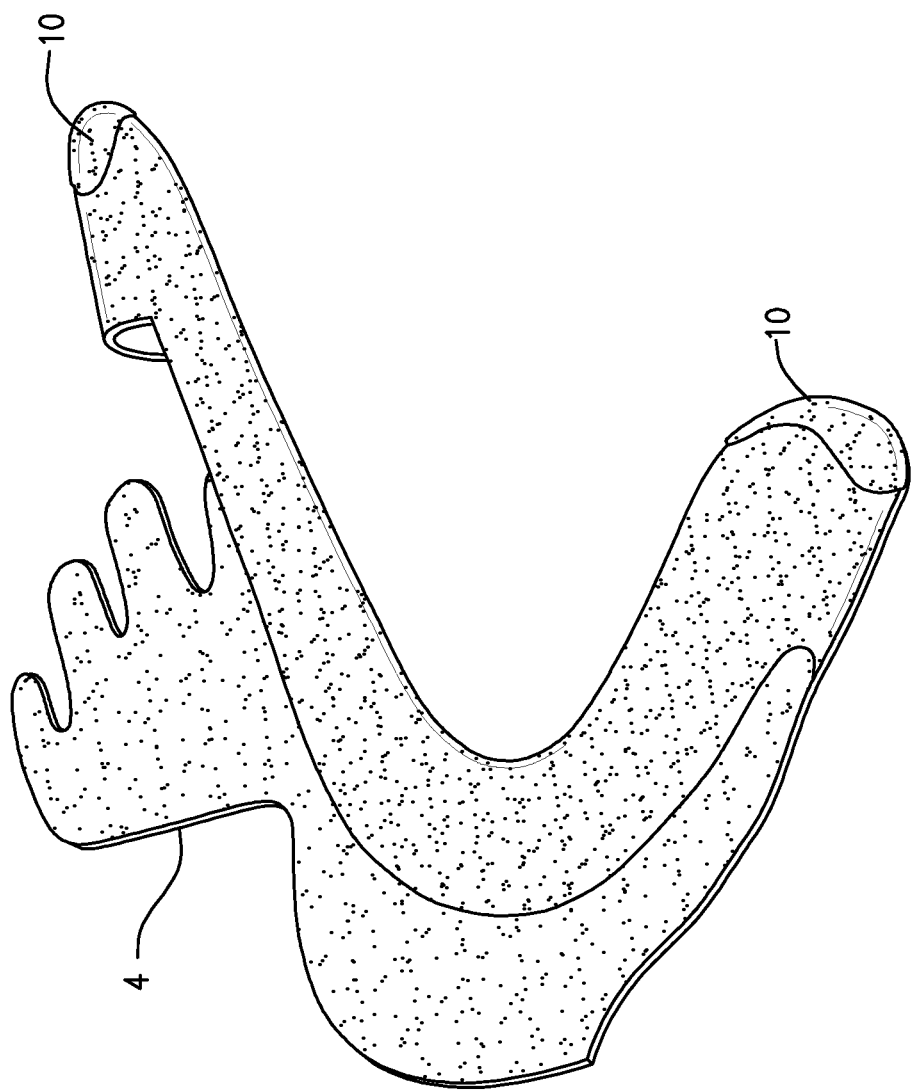
FIG. 3 shows the back of the palm side gripping portion of the glove of FIG. 1.
Figure 4:
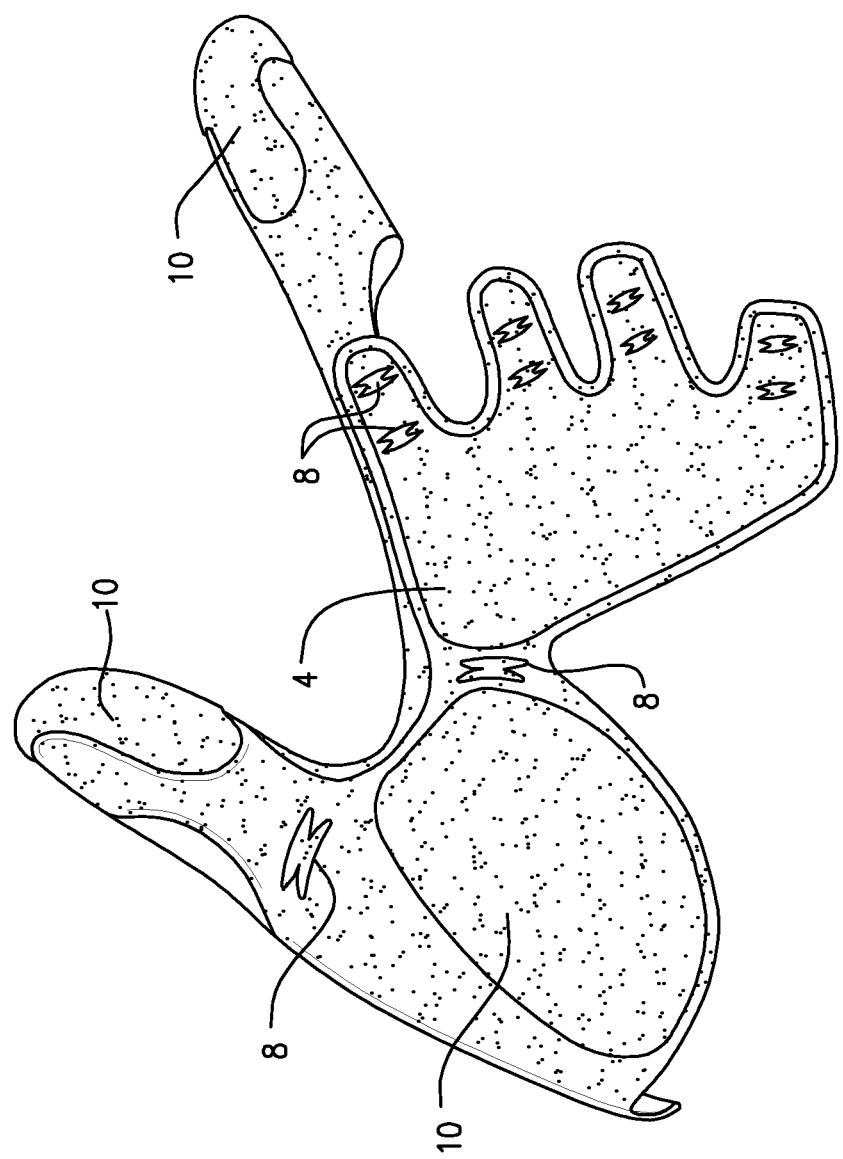
FIG. 4 shows the palm side of the palm gripping portion of the glove of FIG. 1 with embossed grip details.
Figure 5:
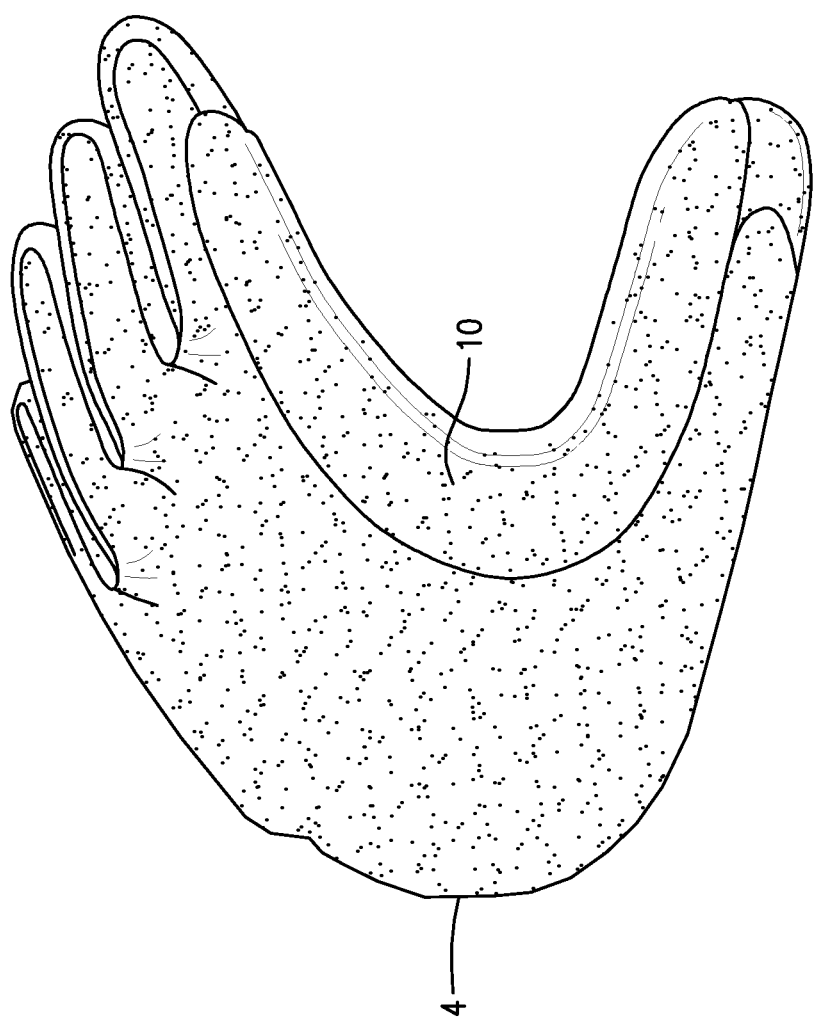
FIG. 5 shows the inside of the palm gripping portion of the gardening glove embodiment.
Figure 8:
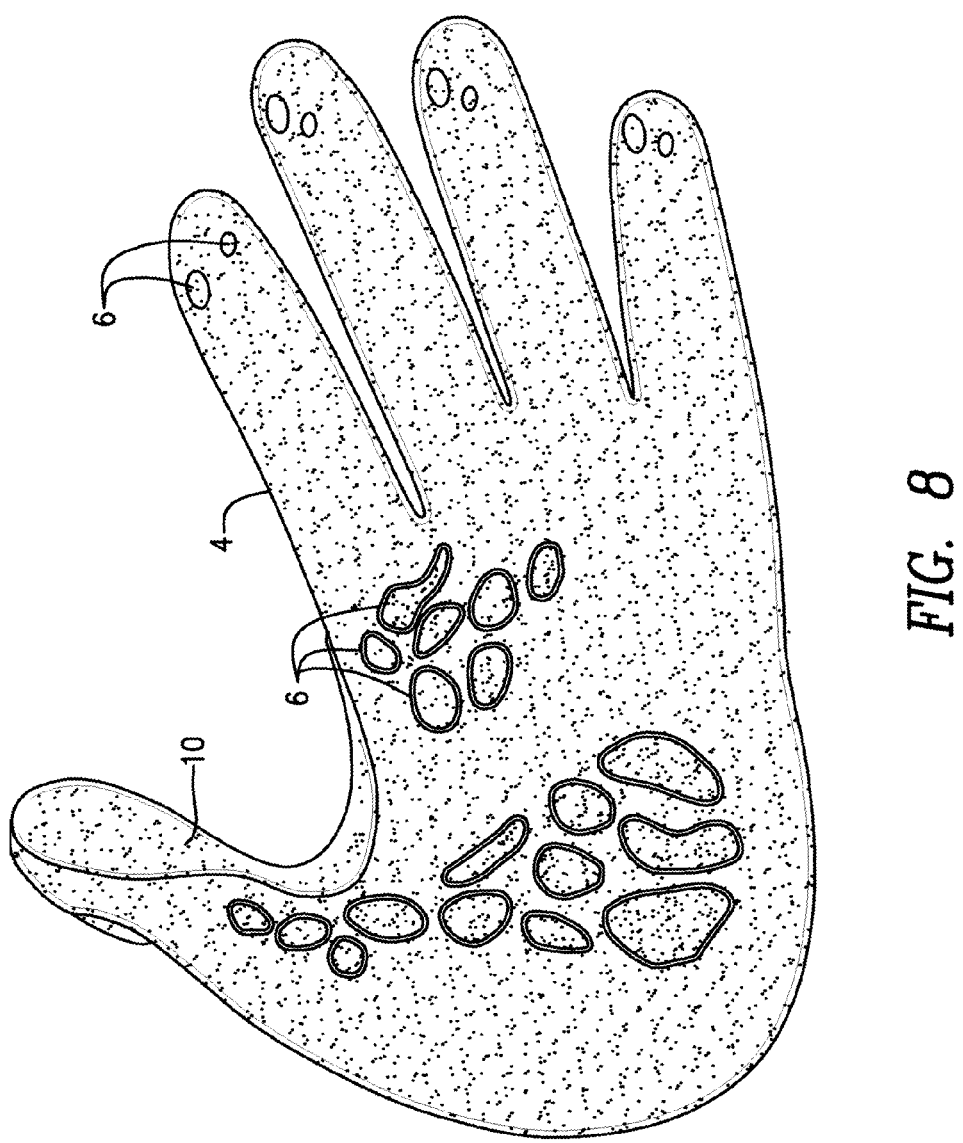
FIG. 8 shows the palm side of the palm gripping portion of FIG. 5.

The molded palm portion 4 of the glove 2, or any molded portion of the glove, is preferably manufactured by using heat resistant knit hydrophilic fabric that can withstand heat of approximately 400 degrees Fahrenheit with a mold that comprises a mold part in the shape of at least a portion of a hand and a corresponding mold part. The heat resistant fabric is preferably in the form of a glove blank or can be cut in the shape of the outlined elastomeric material mold that forms the molded palm portion 4 of the glove 2, as shown in FIGS. 3-4 and/or FIGS. 5 and 8, illustrating an alternative embodiment of the molded palm portion 4 preferred for a gardening glove embodiment. The knit hydrophilic heat resistant fabric is placed against the mold part in the shape of at least a portion of the hand, and preferably the entire hand, and the corresponding mold part is brought into molding relation to create the mold. Once complete, the molder proceeds to inject the part and bond the elastomeric material to the knit hydrophilic fabric to form the molded portion.

Although any suitable knit hydrophilic heat resistant fabric can be used for the glove blank, it has been found that a nylon material is the most suitable for this invention as presently contemplated.

Significantly, the injection molding of the elastomeric material in the present invention permits the application of the elastomeric material on both sides of the glove 2, i.e., the palm side and the back side, while selectively leaving areas on the back of the glove 2 without an elastomeric material. This ensures breathability of the glove 2, where the open portions without an elastomeric material may have a mesh or other material covering the opening for user comfort.

For the three dimensional portion of the mold, namely the thumb and index finger in the embodiment of FIGS. 3 and 4 and each of the fingers in the embodiment of FIGS. 5 and 8-10, a stay can be inserted that ensures the fingers, including the index finger and thumb, keep their shape. However, the shaped molded part or parts, including the fingers and preferably the palm portion 4 adapted to take a pre-curved concave configuration, are preferably formed by corresponding mold parts where the elastomeric material is injection molded to form the molded part or parts of the glove 2.

In either event, the molded elastomeric material is intended to adhere to all areas of the fabric, including the cap for covering the entire tip of the thumb and index finger or fingers, as well as the majority of the circumference of the thumb and fingers to be covered, that is more than 50% of the circumference of the user's thumb and fingers, as desired.

Optionally, a thin lining material can be inserted into the flat side of the mold prior to shooting the elastomeric material, so that whatever portion of the mold that would be in contact with the palm, thumb and fingers of the user would be lined. Fabric could then be stitched onto the contour of each finger and reinforcement area of the glove 2, if desired.

The final bonded component forming the molded palm portion 4 is then attached to the balance of the glove 2. Preferably, the fabric that is visible on the back of the molded fingers, including the back of the thumb and the back of the index finger in FIGS. 1-4 and all fingers in FIGS. 5-8, is not stitched, but is bonded to the elastomeric material in the molding process.

In the embodiment of FIGS. 1-4, 9 and 10, the molded palm portion 4 is molded about the tip of the thumb and index finger, to form a cap over the tip of the thumb and index finger, and across the palm in the area below the fingers, including up onto a lower portion of the fingers adjacent the fourchettes for the purposes of creating as much of a waterproof construction as possible. The mold would also rise in between the index finger and the thumb for enhanced grip to enable the user to grip trowels, rakes, etc. more effectively. Flex grooves 8 are preferably placed in the areas of at least some of the joints of the hand on the molded palm portion 4, including in the palm area and at the fingers to provide improved flexibility. Raised portions 10, for abrasion resistance or padding, are included at the tips of the thumb and index finger.

With respect to the elastomeric materials used in the formation of the molded palm portion 4, different compositions of elastomeric material can be used in the formation of the molded palm portion 4 or parts thereof. For example, an elastomeric material that is less slippery when wet may be used along the area between the thumb and index finger, allowing the glove to be more versatile in wet conditions. Moreover, if abrasion resistance is of particular importance in an area of the molded palm portion, a denser material can be used in that area. Similarly, where impact resistance is of particular importance in an area, such as a padded area, a less dense elastomeric material may be preferred. The proper applications of such variations will be apparent to one skilled in the art.

Notwithstanding, it has been found that thermoplastic vulcanite (TPV) and thermoplastic rubber (TPR) are preferred materials for forming and serving as the elastomeric material used in the glove 2 of the present invention.

In the embodiments shown in FIGS. 5-10, molded palm portion 4 preferably covers the entire palm side and the majority of the sides of all fingers, i.e., at least 50% of the circumference of the fingers, which is desirable for gardening gloves. The palm portion 4' is preferably pre-curved in a concave configuration to minimize bunching when the wearer's hand closes. The molded palm portion 4 also preferably contains embossed gripping details 6, such as textured loops, to increase gripping and enhance the protection of the user. The back portion of the glove 2 preferably includes a closure element, shown in the form of a stretchable material 18 rather than a wrist strap 16, to provide a tight and comfortable fit while permitting easy insertion and removal of the wearer's hand.

Of course, the molded palm portion 4 of the glove 2 of FIGS. 5-10 is also amenable to molding with any variety of different patterns shapes and designs, including padded or raised portions 10, greater or lesser pre-curving of the palm portion 4' to create a predetermined cupped shape, flex grooves 8 or textured areas 6. The benefits of these features would similarly be the comfort, cosmetic value, waterproofing, which may be important for some uses such as gardening, as well as providing padding in critical impact areas, and additional grip and or abrasion resistance in critical areas of the glove.

Figure 9:
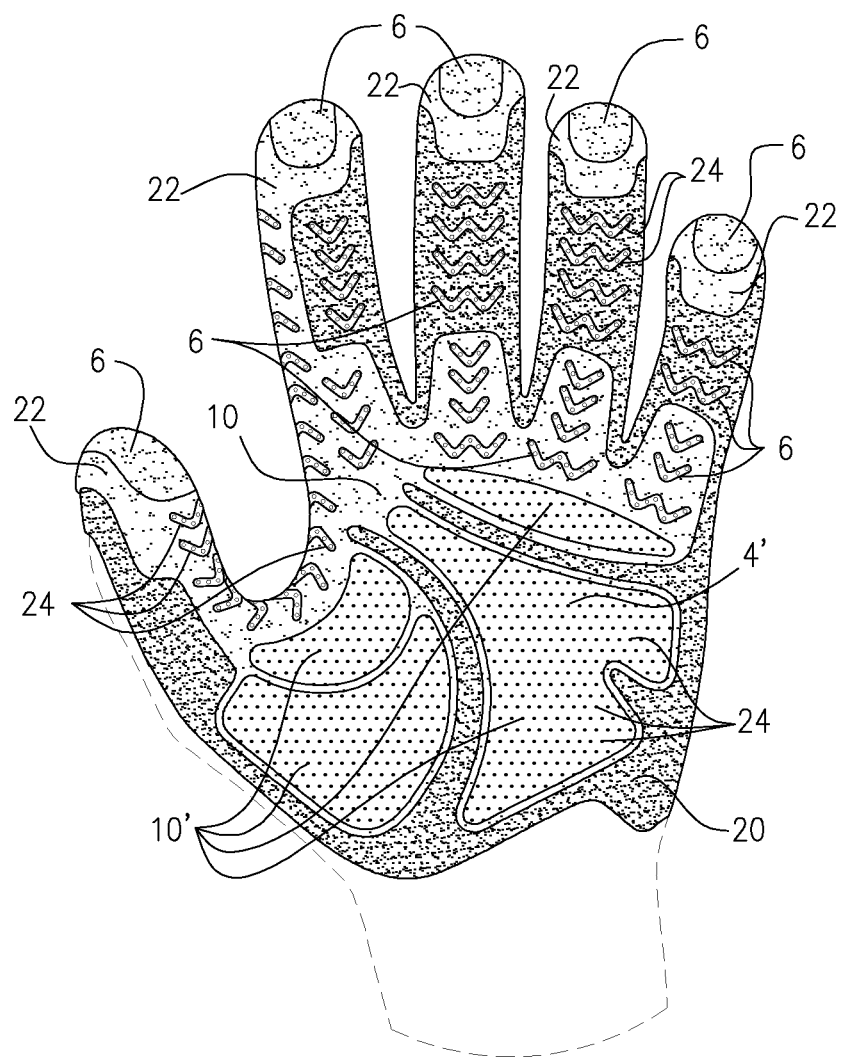
FIG. 9 shows a front view, palm side, of a preferred embodiment of a utility glove according to the invention.
Figure 10:
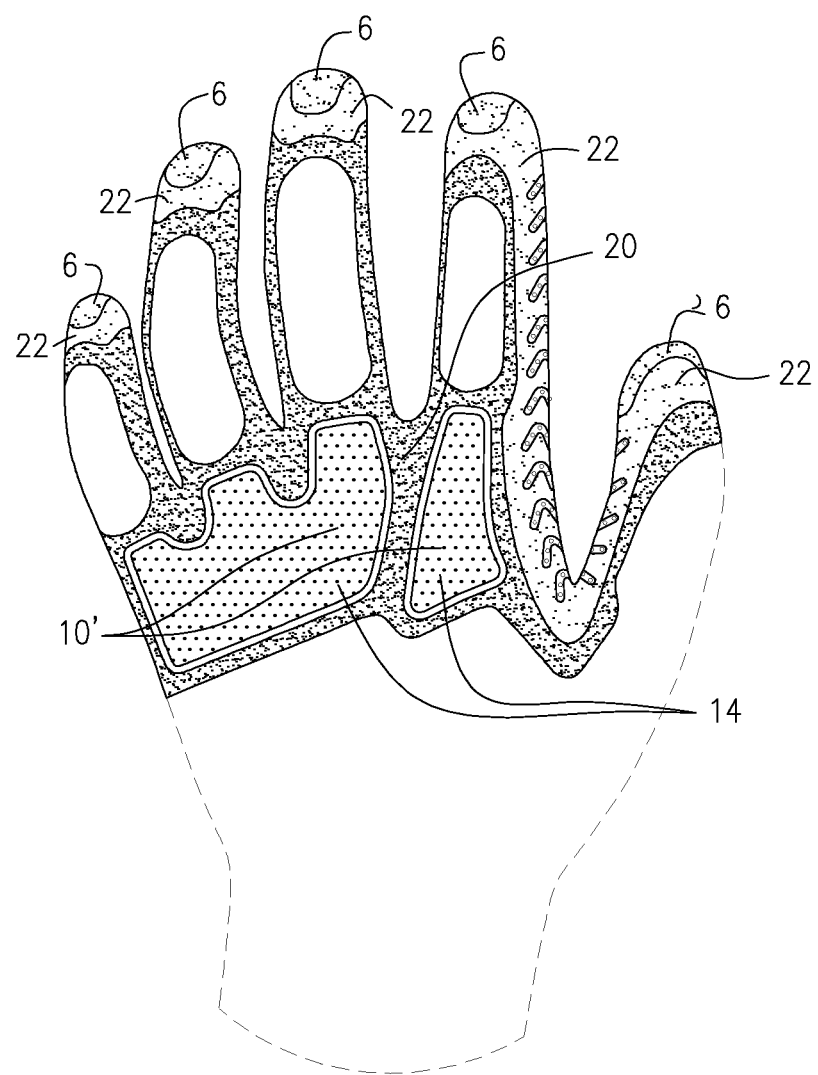
FIG. 10 shows a back view of the glove of FIG. 9.

In the preferred embodiment of FIGS. 9 and 10, the molded pre-curved palm portion 4' continues to the fingers to form a cupped shape including the fingers, again to minimize bunching when the hand is closed. Also incorporated in this embodiment are raised portions 10 having stepped thicknesses to maximize flexibility, wear and cushioning. Most preferably, the areas of the embodiment of FIG. 9 forming the molded first areas 20, shown as about and within the palm, between the fingertips and joint between the fingers and the palm and around the back of the glove, is formed of an elastomeric material that is from about 0.6-1.0 mm, and preferably about 0.8 mm. This provides maximum flexibility for the user.

The molded second areas 22 of the embodiment of FIGS. 9 and 10, being at the fingertips, between the forefinger and thumb and across the area between the palm and the fingers, is comprised an intermediate raised area 10. The molded second areas 22 are formed of an elastomeric material that is from about 1.2-1.6 mm, and preferably about 1.4 mm. This provides maximum durability for wear and extra protection without sacrificing feel.

The molded third areas 24 of the embodiment of FIGS. 9 and 10, being within the palm and across the knuckles on the back of the glove, is comprised of an extra raised area 10'. The molded third areas 24 are formed of an elastomeric material that is from about 1.6-2.0 mm, and preferably about 1.8 mm. This provides maximum protection for the portions of the users hand most likely to receive traumatic impact. Most preferably, the embodiment of FIGS. 9 and 10 provide a glove 2 with an elastomeric material that extends 360° about the glove 2, with openings to permit airflow, and therefore breathability to the glove 2.

Of course, in addition to or alternatively, the elastomeric material in the various areas 20, 22 and 24 may have different physical characteristics. These include differences in density, tackiness, flexibility, etc.

Also as shown in FIGS. 9 and 10, the elastomeric portions of the glove 2 may include perforations 24 that extend from the exterior of the glove 2 to the interior of the glove. These perforations 24 not only provide ventilation between the interior and exterior of the glove 2, enhancing user comfort, but may provide a vacuum grip where a vacuum is created between the user's finger sealing off the perforation 24 at the interior of the glove 2 and the article to be held at the exterior of the glove 2.

Additionally, the molded portion of the glove 2 of FIGS. 9 and 10 includes gripping details 6 in the form of a gnarled surface, "v" and/or "w" shaped members that displace moisture both horizontally and vertically to create improved grip in wet or slippery conditions. As shown in the drawings, but without limitation, the gripping details 6 may have perforations 24 thereon to further increase grip by the use of a vacuum effect, as described above.

Moreover, as will be apparent to those skilled in the art, the glove 2 of the present invention can be designed with different combinations of the components described above. For example, the glove 2 of FIGS. 1-2 could be fashioned with a stretchable material 18 rather than a wrist strap 16, or could include a molded palm portion 4 that covers the front and sides of all of the fingers. Additionally, although the only embodiments shown include a molded palm portion over only the index finger and thumb or all fingers and thumb, it is understood that the front and sides of any number of fingers can be covered.

It will thus be seen that the objects set forth above, among those made apparent in the preceding description, and more are sufficiently obtained and, since certain changes may be made in the above constructions without departing from the spirit and scope of the invention, it is intended that all matter contained in the above description or shown in the accompanying drawings shall be interpreted as illustrative, and not in a liming sense. In this regard, and without limitation, the various features shown in the several embodiments described can be applied singularly or in any number of combinations without falling beyond the scope of the invention.

It is also to be understood that the following claims are intended to cover all of the generic and specific features of the invention, herein described and all statements of the scope of the invention which, as a matter of language, might be said to fall therebetween.

The invention claimed is:

1. A utility glove having an exterior and an interior, a glove front corresponding to at least a portion of the palm side of the hand and a glove back corresponding to at least a portion of the back of the hand, said utility glove comprising a three dimensional molded portion formed of an elastomeric material bonded to a fabric, the fabric having an interior corresponding to the interior of the glove and an exterior to which the elastomeric material is bonded, with the elastomeric material of the molded portion integrally formed on the exterior of the glove, said molded portion having:
- a. a thumb portion comprising a cap for covering a tip of the thumb about the entire circumference of the tip of the thumb;
- b. four finger portions each comprising a cap for covering a tip of the finger about the entire circumference of the tip of the finger;
- c. a knuckle portion for covering at least a portion of the glove back over a plurality of finger knuckles on the back of a main body of the hand where the fingers meet the main body of the hand; and
- d. a palm having a middle and edges, the palm formed in a pre-curved configuration with the middle of the palm set in from the edges of the palm to form a concave shape on the exterior of the glove from the edges to the middle of the palm, wherein the molded portion extends continuously from the palm to the caps of each of the thumb portion and finger portions on at least a portion of the glove front.

2. The utility glove of claim 1 wherein the molded portion comprises one or more padded areas.

3. The utility glove of claim 1 wherein the molded portion comprises textured gripping portions integrally formed of the molded elastomeric material.

4. The utility glove of claim 3 wherein the textured gripping portions of the molded portion are taken from the group consisting of gnarled portions, w-shaped members, v-shaped members, textured loops, perforations and embossed gripping details.

5. The utility glove of claim 1 wherein the elastomeric material of the molded portion is integrally formed 360° about the exterior of the glove.

6. The utility glove of claim 1 wherein the molded portion is pre-curved from the palm to the at least one finger portion.

7. The utility glove of claim 1 wherein the thumb portion and four finger portions are formed to cover more than 50% of the circumference of at least one of the wearer's thumb and at least one finger.

8. The utility glove of claim 1 further comprising flex grooves on the molded portion corresponding to at least one joint of a hand.

9. The utility glove of claim 1 wherein the elastomeric material comprises a plurality of perforations from the exterior to the interior of the glove.

10. The utility glove of claim 1 wherein the molded portion has different areas formed from different compositions of elastomeric materials.

11. The utility glove of claim 1 wherein the molded portion further comprises:
- e. a connection between the palm on the glove front and the knuckle portion on the glove back formed continuously between at least one pair of adjacent fingers.

12. A utility glove having an interior and an exterior, a glove front corresponding to at least a portion of the palm side of the hand and a glove back side corresponding to at least a portion of the back of the hand, said glove front including a palm area, a thumb and four fingers and said glove back including a knuckle area corresponding to the finger knuckles on the back of the main body of the hand, a thumb and four fingers, the utility glove comprising a three dimensional molded portion formed of an elastomeric material bonded to a fabric, said elastomeric material of the molded portion integrally formed to cover at least a portion of the exterior of the glove front, the portion of the exterior of the glove front including at least a portion of the palm area, at least a portion of the thumb and at least a portion of each of the four fingers continuously from the palm area to a tip of each of the thumb and fingers, and at least a portion of the exterior of the glove back, the portion of the exterior of the glove back including at least a portion of the knuckle area including covering a plurality of the finger knuckles on the back of the main body of the hand, wherein the molded portion is formed to entirely surround one or more openings comprising an area of fabric without elastomeric material.

13. The utility glove of claim 12 wherein the elastomeric material integrally covers at least a portion of the thumb on the glove front and at least a portion of the thumb on the glove back, at least a portion of at least one of the four fingers on the glove front and at least a portion of the at least one of the four fingers on the glove back, at least a portion of the palm area and at least a portion of the knuckles.

14. The utility glove of claim 13 wherein the elastomeric material of the molded portion is also integrally formed to cover the tip of the thumb and each of the four fingers.

15. The utility glove of claim 13 wherein the elastomeric material covering at least a portion of the thumb and the at least a portion of the four fingers is formed to cover more than 50% of the circumference but less than 100% of at least one of the wearer's thumb and at least one finger.

16. The utility glove of claim 12 wherein the elastomeric material of the molded portion is integrally formed 360° about the exterior of the glove.

17. The utility glove of claim 16 wherein at least one opening of the one or more openings is on at least a portion of the back of at least one finger of the four fingers.

18. The utility glove of claim 12 wherein at least one opening of the one or more openings is on at least a portion of the back of at least one finger of the four fingers.

19. The utility glove of claim 12 wherein the palm of the molded portion is formed in a pre-curved configuration with the middle of the palm set in from the edges of the palm to form a concave shape on the exterior of the glove from the edges to the middle of the palm.

20. The utility glove of claim 12 wherein the molded portion is pre-curved from the palm to the at least one finger area.

21. The utility glove of claim 12 wherein the molded portion further comprises one or more padded areas.

22. The utility glove of claim 12 wherein the molded portion further comprises one or more textured gripping portions.

23. The utility glove of claim 22 wherein the one or more textured gripping portions are taken from the group consisting of gnarled portions, w-shaped members, v-shaped members, textured loops, perforations and embossed gripping details.

24. The utility glove of claim 12 wherein the molded portion further comprises flex grooves corresponding to at least one joint of a hand.

25. The utility glove of claim 12 wherein the elastomeric material comprises a plurality of perforations from an exterior of the elastomeric material to an interior of the elastomeric material, said perforations being in addition to and significantly smaller than the openings.

26. The utility glove of claim 12 wherein the molded portion has different areas formed from different compositions of elastomeric materials.

27. The utility glove of claim 12 wherein the fabric in the area of fabric without elastomeric material is taken from the group consisting of a knit fabric and a mesh fabric.

28. The utility glove of claim 12 further wherein the integrally formed elastomeric material of the molded portion further comprises a continuous connection between the palm on the glove front and the knuckle portion on the glove back extending between at least one pair of adjacent fingers.

* * * * *